US007796525B2

(12) United States Patent
Wu

(10) Patent No.: US 7,796,525 B2
(45) Date of Patent: Sep. 14, 2010

(54) APPARATUS AND METHOD FOR SWITCHING CONNECTIVITY OF OBJECTS TO BE SENSED

(75) Inventor: Chen-Meng Wu, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1803 days.

(21) Appl. No.: 10/839,632

(22) Filed: May 4, 2004

(65) Prior Publication Data
US 2005/0090909 A1 Apr. 28, 2005

(30) Foreign Application Priority Data
Oct. 28, 2003 (TW) ............... 92129847 A

(51) Int. Cl.
*G08B 21/00* (2006.01)
(52) U.S. Cl. ............... 370/241; 340/635; 340/540; 340/653
(58) Field of Classification Search ............... 370/360, 370/241; 361/160, 171, 195, 141, 3; 340/635, 340/540, 653
See application file for complete search history.

(56) References Cited

U.S. PATENT DOCUMENTS

| | | | | |
|---|---|---|---|---|
| 3,803,495 | A | * | 4/1974 | Reynolds ............... 455/166.2 |
| 4,177,456 | A | * | 12/1979 | Fukinuki et al. ............... 341/67 |
| 4,270,219 | A | * | 5/1981 | Murata et al. ............... 455/179.1 |
| 4,589,024 | A | * | 5/1986 | Koch et al. ............... 348/297 |
| 5,374,994 | A | | 12/1994 | Kimura |
| 5,530,615 | A | * | 6/1996 | Miller et al. ............... 361/160 |
| 6,300,883 | B1 | * | 10/2001 | Tyburski et al. ............... 340/933 |
| 6,539,316 | B1 | * | 3/2003 | Doten et al. ............... 702/48 |
| 6,749,281 | B2 | * | 6/2004 | Asauchi ............... 347/19 |
| 6,871,933 | B2 | * | 3/2005 | Li ............... 347/19 |

(Continued)

FOREIGN PATENT DOCUMENTS

CN    1068739 C    12/1996

(Continued)

OTHER PUBLICATIONS

IEEE Transactions on Nuclear Science, vol. NS-28, No. 1, Feb. 1981; A Modular Stand-Alone Monitor and Control System (SAMAC); J. Kieffer; Stanford Linear Accelerator Center.*

*Primary Examiner*—Salman Ahmed
(74) *Attorney, Agent, or Firm*—Wei Te Chung

(57) ABSTRACT

An apparatus for switching connectivity of fans to be sensed includes a primary control board (2) and a secondary control board (4). The secondary control board is connected to the primary control board via sensing lines (3) and control lines (5), and connected to the fans via sensing lines. The secondary control board includes a control circuit (41) that includes a counter, and a switch circuit (42) that includes two data selectors each of which has a channel selection port, input ends and an output end. The channel selection port is connected to an output port of the counter for determining which fan is to be sensed. The input ends are connected to the fans to be sensed in one-to-one correspondence. The output end is connected to the primary control board via one of the sensing lines. A method for switching connectivity of fans to be sensed is also disclosed.

8 Claims, 4 Drawing Sheets

U.S. PATENT DOCUMENTS

| | | | |
|---|---|---|---|
| 6,993,543 B2 * | 1/2006 | Hars | 708/250 |
| 7,000,130 B2 * | 2/2006 | Adachi | 713/322 |
| 7,239,098 B2 * | 7/2007 | Masino | 318/400.35 |
| 2002/0067277 A1 * | 6/2002 | Nishimura et al. | 340/635 |
| 2003/0043129 A1 * | 3/2003 | Tazuke | 345/204 |
| 2003/0067933 A1 | 4/2003 | Huffschmid | |
| 2004/0179054 A1 * | 9/2004 | Li | 347/19 |
| 2005/0259578 A1 * | 11/2005 | Shinagawa et al. | 370/230 |
| 2009/0139261 A1 * | 6/2009 | Nakano et al. | 62/455 |

FOREIGN PATENT DOCUMENTS

| | | |
|---|---|---|
| CN | 1262465 A | 8/2000 |

* cited by examiner

US 7,796,525 B2

APPARATUS AND METHOD FOR SWITCHING CONNECTIVITY OF OBJECTS TO BE SENSED

BACKGROUND OF THE INVENTION

1. Field of the Invention

The present invention relates to an apparatus and method for switching electrical connectivity of objects, and in particular to an apparatus and method for switching connectivity of objects in order to respectively collect information on the objects.

2. Background of the Invention

Heat sinking is a very important task provided for high-speed integrated electronic apparatuses. If an electronic apparatus does not have an adequate heat sinking system, it is prone to malfunction or even break down altogether. Providing accurate control of components involved in heat sinking is one solution for improving the performance and reliability of the electronic apparatus. In the current electronics market, there are some integrated circuits (ICs) available that can sense the speed of rotation of a fan in a heat sinking system for an electronic apparatus. By analysis of the rotation speed using corresponding software, users can obtain information on whether the fan is operating within normal parameters. Taiwan Patent Issue No. 412012 discloses an apparatus for sensing a speed of rotation of a heat sink fan. The apparatus is mounted on a power circuit of a motor of the heat sink fan. The apparatus includes a resistance disposed on a ground line of the power circuit of the motor, the resistance being coupled to a diode. The diode is electronically connected to a capacitor, which in turn is linked to an input end of a comparator. When the motor is started up, an intermittent pulse current enters the motor, passes through the resistance, and generates an intermittent voltage. The intermittent voltage is input into the comparator by way of the diode and the capacitor. Thereupon, the comparator outputs a frequency pulse to the apparatus. The apparatus can obtain the rotate speed of the motor based on a change of the frequency pulse.

In other electronic systems, there may be a plurality of fans employed in a heat sinking system. One such electronic system is illustrated in FIG. 4. Each of fans 1 is electronically connected to a primary control board 2 via a sensing line 3. In this way, the primary control board 2 can obtain information on rotation speeds of the fans 1. When the number of fans 1 is large, a number of the sensing lines 3 is correspondingly large. If the number of sensing lines 3 is particularly large, the area of the primary control board 2 needs to be correspondingly broad. Alternatively, the distance between any two of the sensing lines 3 needs to be reduced. A large primary control board 2 militates against the modern trend toward miniaturization of electronic devices. If the sensing lines 3 are too close together, signals carried therein are prone to crosstalk. If the signal quality of the sensing lines 3 is reduced, this may adversely affect the electronic control and the performance of the heat sinking system.

In view of the above-described shortcomings, an apparatus and method is needed for conveniently and reliably sensing rotation speeds of fans in a multi-fan heat sinking system.

SUMMARY OF THE INVENTION

Accordingly, an objective of the present invention is to provide an apparatus for switching electrical connectivity of objects such as fans in order to respectively collect information on the objects.

Another objective of the present invention is to provide a method for switching electrical connectivity of objects such as fans in order to respectively collect information on the objects.

In order to accomplish the above-mentioned first objective, a preferred embodiment of an apparatus for switching connectivity of fans to be sensed comprises a primary control board and a secondary control board. The secondary control board is connected to the primary control board via sensing lines and control lines, and connected to the fans via sensing lines. The secondary control board comprises a control circuit and a switch circuit. The control circuit comprises a counter. Output of the counter is controlled under a status of said control lines: enablement or disablement, and is used for determining which fan is to be sensed. The switch circuit comprises two data selectors, each of which has a channel selection port, a plurality of input ends and an output end. The channel selection port is connected to an output port of the counter of the control circuit. The input ends are connected to the fans to be sensed in one-to-one correspondence. The output end is connected to the primary control board by one of the sensing lines.

In order to accomplish the above-mentioned second objective, a preferred method for switching connectivity of objects to be sensed comprises the steps of: (a) enabling a reset signal line for zeroing a counter, an output of the counter determining a current object to be sensed; (b) disabling the reset signal line; (c) collecting information on the current object; (d) determining whether information on all the objects has been collected, and completing the procedure if information on all the objects has been collected; or (e) enabling a switch signal line to trigger the counter to determine a next object to be sensed, if information on all the objects has not been collected; and (f) disabling the switch signal line and returning to step (c).

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Figure 1:
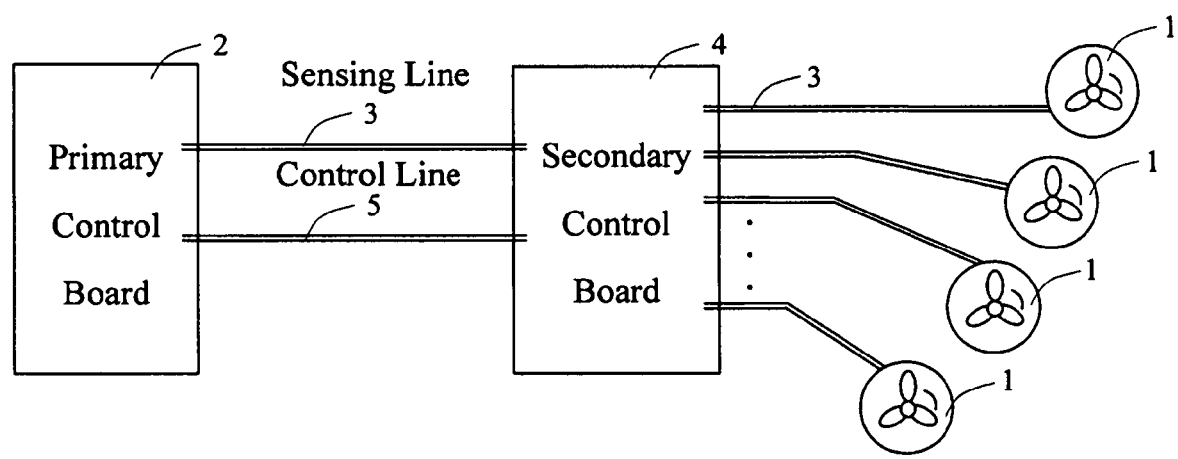
FIG. 1 is a schematic diagram of a control circuit for switching connectivity of objects to be sensed in accordance with a preferred embodiment of the present invention.

FIG. 1 is a schematic diagram of a control circuit for switching connectivity of objects to be sensed in accordance with a preferred embodiment of the present invention. In the preferred embodiment, the objects to be sensed are a plurality of electrical rotary fans 1. In other alternative embodiments, the objects to be sensed may be other electronic apparatuses. The control circuit comprises a primary control board 2 and a secondary control board 4 that is connected to the primary control board 2 through two sensing lines 3 and two control lines 5. The fans 1 are respectively connected to the secondary control board 4 via a plurality of sensing lines 3. That is, only four lines connect the primary control board 2 to the secondary control board 4. The secondary control board 4 collects sensed information on the plurality of fans 1 by way of the sensing lines 3 connected to the fans 1, and transmits the collected information to the primary control board 2 through the two sensing lines 3 that connect the primary control board 2 with the secondary control board 4. In the preferred embodiment of the present invention, the sensed information on the fans 1 is related to speeds of rotation of the fans 1. In other alternative embodiments, the sensed information may be other information such as temperatures of objects. After information on one of the fans 1 is collected, the secondary control board 4 may be switched to connect to another fan 1 for collecting information on the other fan 1.

Figure 2:
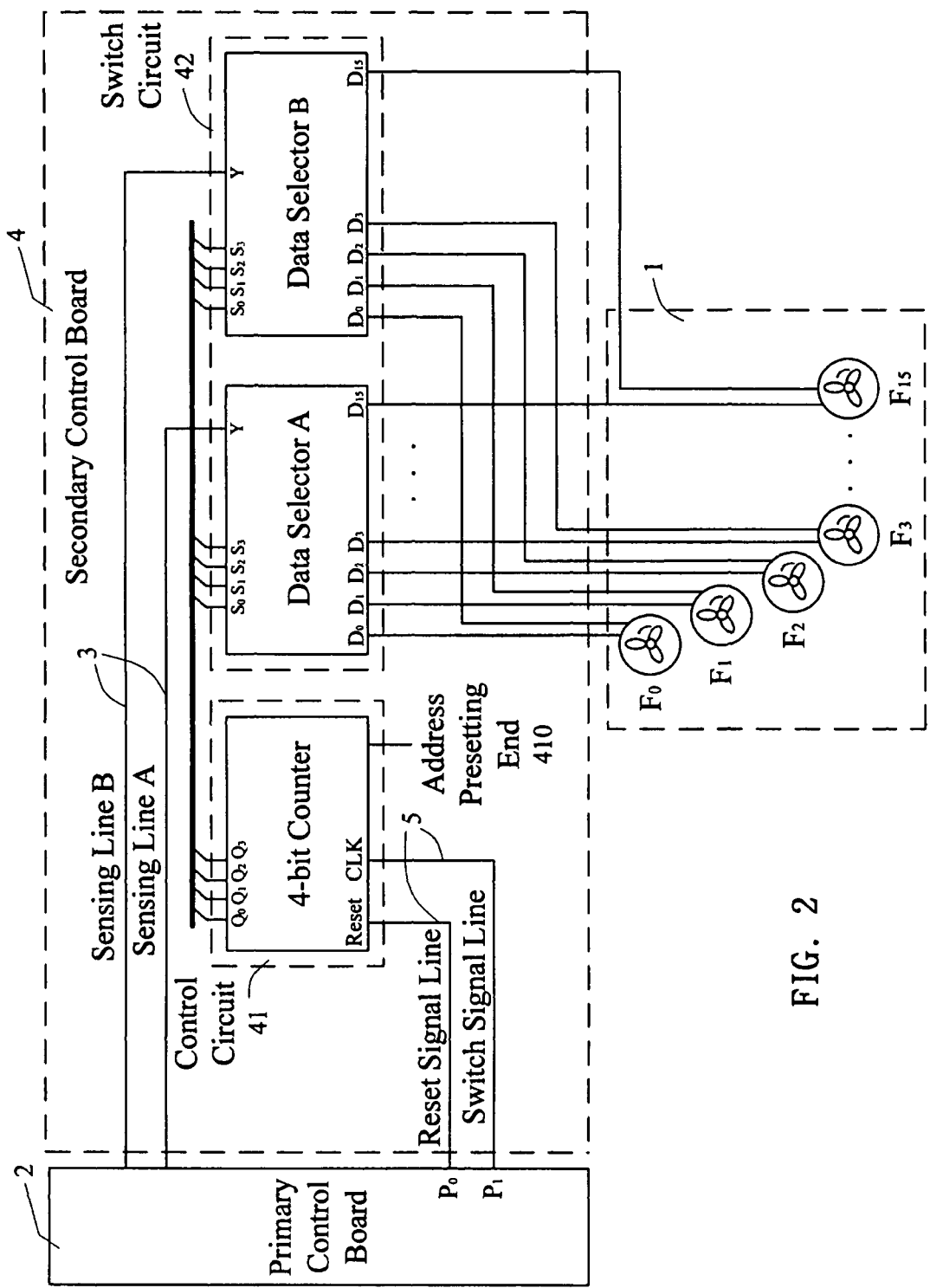
FIG. 2 is a schematic diagram of a detailed layout of the control circuit shown in FIG. 1.

FIG. 2 is a schematic diagram of a detailed layout of the control circuit shown in FIG. 1. In the preferred embodiment of the present invention, it is assumed that there are sixteen objects, i.e. sixteen fans 1, to be sensed. The 16 fans 1 are labeled with $F_0, F_1, F_2, \ldots$ through $F_{15}$. Each fan 1 is coupled with two sensing lines 3 for transmitting sensed information on the fan 1 to the secondary control board 4. The information on each of the fans 1 is collected by a sensing unit (for example, a sensing integrated circuit, not shown in FIG. 2) fixed thereon. The sixteen fans 1 described herein are merely provided for illustrating the preferred embodiment, and can be varied appropriately in other alternative embodiments.

The primary control board 2 comprises one or more control units (not shown in FIG. 2). Each control unit may be a simple single chip such as an 8051 chip, or a relatively complicated component such as an X86 CPU, a memory, a chip set or the like. The control unit is provided for receiving sensed information on the fans 1 transmitted by the secondary control board 4, and for storing the received sensed information in a predetermined storage apparatus.

The secondary control board 4 comprises a control circuit 41 and a switch circuit 42. The control circuit 41 has a counter. In the preferred embodiment, the counter is a 4-bit counter such as a 74163-type counter. The counter is coupled with two control lines 5: one is a reset signal line, the other is a switch signal line. The two control lines 5 are connected to the primary control board 2. In the preferred embodiment, a $P_0$ end on the primary control board 2 is coupled with the reset signal line, and a $P_1$ end on the primary control board 2 is coupled with the switch signal line. Via control of voltage levels of the $P_0$ end and the $P_1$ end, the primary control board 2 may enable or disable the reset signal line and the switch signal line. In the preferred embodiment of the present invention, the default voltage level of the $P_0$ end and the $P_1$ end is a low voltage level. When the $P_0$ end is at a high voltage level and the $P_1$ end is at a low voltage level, the reset signal line is enabled, and zeroes the counter or sets a default value for the counter. At this time, a value of an output port of the counter, which has four ends $Q_0, Q_1, Q_2, Q_3$, is "0000," or the default value. When the $P_1$ end is at a high voltage level and the $P_0$ end is at a low voltage level, the switch signal line is enabled, and the reset signal line is disabled. At this time, the counter is triggered, and the value of the output port of the counter may be varied between "0000" and "1111."

The switch circuit 42 comprises one or more data selectors. In the preferred embodiment, there are two data selectors: a data selector A, and a data selector B. Each of the data selectors A, B has 16 data input ends $D_0, D_1, D_2, \ldots D_{15}$, a channel selection port with four ends $S_0, S_1, S_2, S_3$, and a data output end Y.

The four ends $Q_0, Q_1, Q_2, Q_3$ of the output port of the counter are correspondingly connected to the four ends $S_0$, $S_1, S_2, S_3$ of the channel selection ports of each of the data selectors A, B. That is, the end $Q_0$ is connected to the end $S_0$, the end $Q_1$ is connected to the end $S_1$, and suchlike. In this way, the value of the output port of the counter is equal to the value of the channel selection port. The value of the channel selection port is configured for determining the particular fan 1 whose information will be collected by the data selector A and the data selector B. For instance, if the value of the channel selection port is "0000" as determined by the four ends $S_0, S_1, S_2, S_3$, the data selector A and the data selector B will collect information on the fan $F_0$. Analogically, if the value of the channel selection port is "0001," the data selector A and the data selector B will collect information on the fan $F_1$, and so on. Two sensing lines 3 of each of the fans 1 are respectively linked to an input end of the data selector A and to an input end of the data selector B. For example, two sensing lines of the fan $F_0$ are respectively linked to the input end $D_0$ of the data selector A and the input end $D_0$ of the data selector B. This linking manner is analogically applied to the fans $F_1, F_2, F_3, \ldots$ and $F_{15}$. The data selector A and the data selector B are linked to the primary control board 2 respectively via a sensing line A and a sensing line B.

As described above, with the variation of the value of the channel selection port as determined by the ends $S_0, S_1, S_2, S_3$, the data selector A or the data selector B may collect information on any of the different fans 1, i.e. the fans $F_0, F_1, F_3, \ldots$ or $F_{15}$. For example, if the value of the output port of the counter is "0000," the values of the channel selection ports of the data selector A and the data selector B are "0000." At the time, the data selector A and the data selector B collect information on the fan $F_0$, and output the collected information to the primary control board 2 through the respective output ends Y thereof. According to the foregoing description, the value of the output port of the counter may be varied between "0000" and "1111" when the switch signal line is enabled while the reset signal line is disabled by the primary control board 2. Thus, under the control of the primary control board 2, information on all the fans 1 can be collected by the data selector A and the data selector B.

The counter of the control circuit 41 further comprises an address presetting end 410, which is provided for setting a default value of the output port of the counter. The address presetting end 410 is very useful when users usually want to obtain information on a single particular fan 1. For instance, if the users usually want to obtain information on the fan $F_2$, they can set the default value of the output port of the counter as "0010." Thus each time the reset signal line is enabled, the data selector A and the data selector B collect information on the fan $F_2$, and transfer the information to the primary control board 2.

Figure 3:
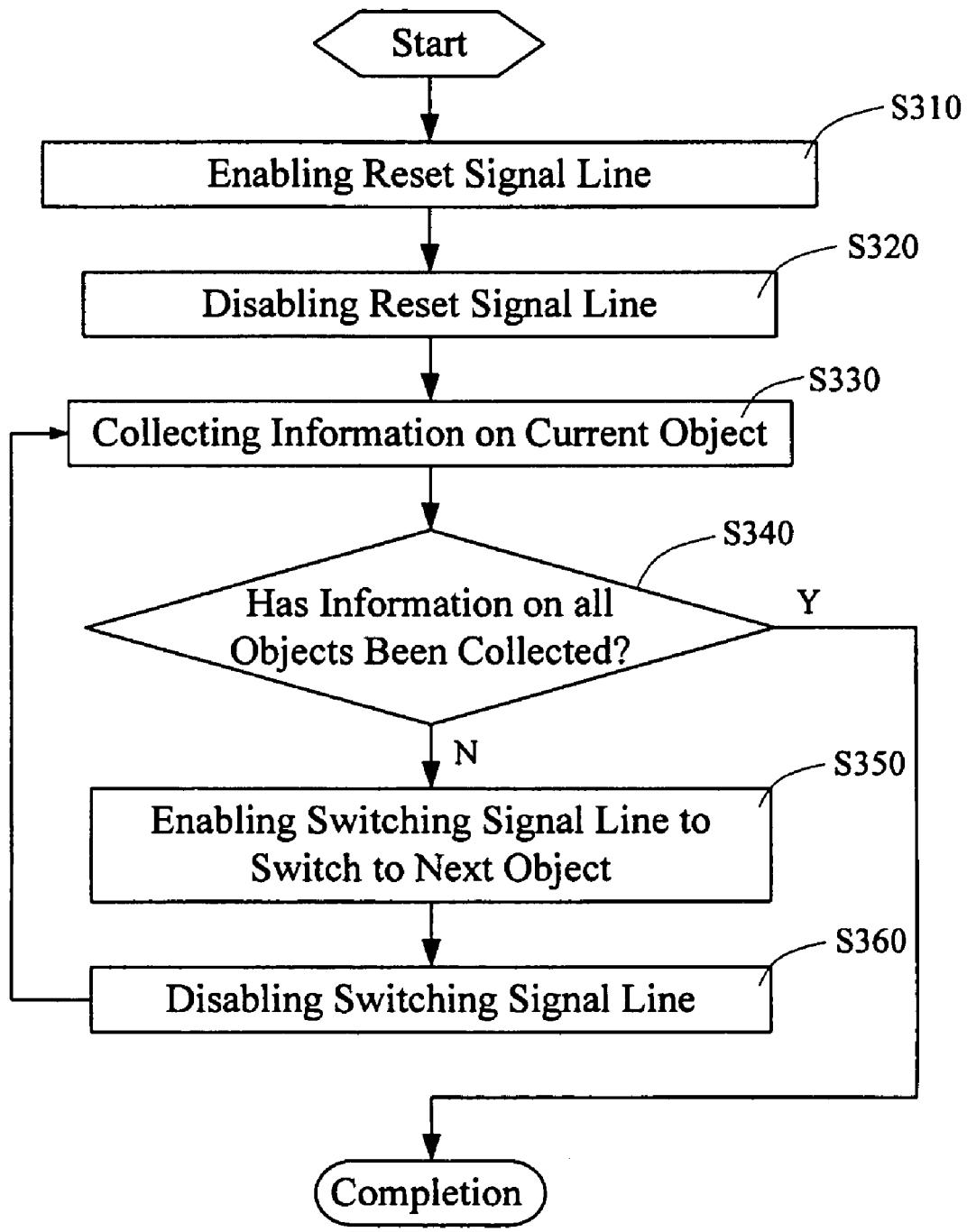
FIG. 3 is a flow chart of switching connectivity of objects such as fans for collecting information thereon, in accordance with the preferred embodiment of the present invention.
Figure 4:
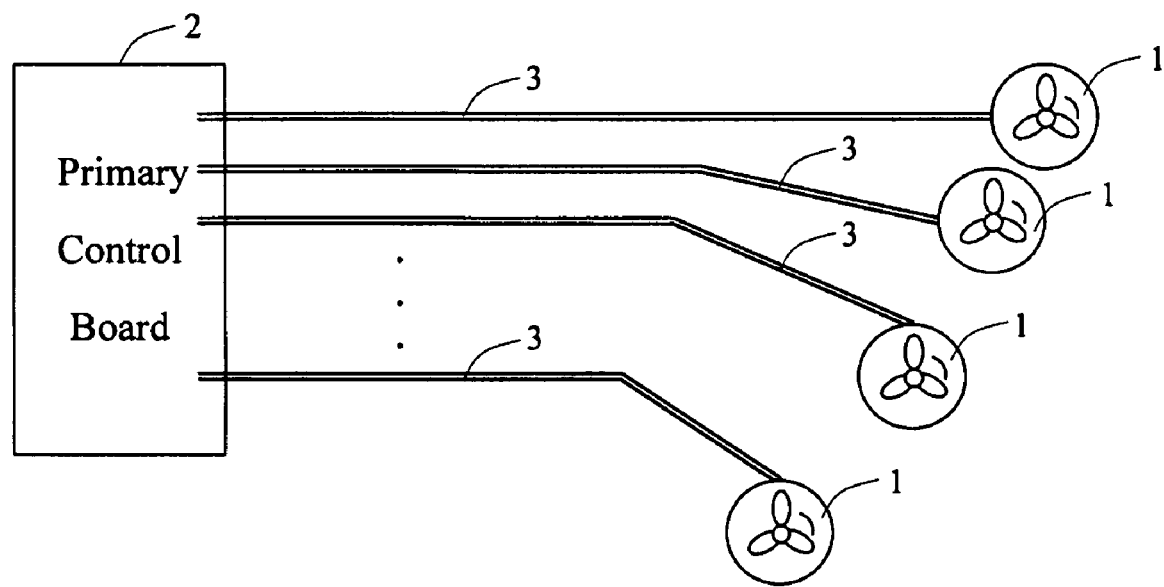
FIG. 4 is a schematic diagram of a conventional control circuit in which a plurality of fans is connected to a primary control board.

FIG. 3 is a flow chart of switching connectivity of objects such as the fans 1 for collecting information thereon, in accordance with the preferred embodiment of the present invention. At step S310, the reset signal line is enabled, so that the counter of the control circuit 41 is zeroed. Therefore the value of the output port of the counter is "0000," and the fan $F_0$ is selected. At this step, alternatively, the address presetting end 410 can be previously set with a particular value, such as 0010. Thus, a predetermined fan 1 corresponding to the particular value, such as the fan $F_2$, may be selected when the reset signal line is enabled. At step S320, the reset signal line is disabled. At step S330, the data selector A and the data selector B collect information on the fan $F_0$ or the predetermined fan 1. At step S340, the primary control board 2 determines whether information on each of the fans 1 has been collected. If information on each of the fans 1 has been collected, the procedure is completed. If information on one or more of the fans 1 has not been collected, at step S350, the switch signal line is enabled. At the same time, the counter is triggered, the value of the output port thereof is increased by one, and the data selector A and the data selector B select a next fan 1. At step S360, the switch signal line is disabled. Then the procedure returns to step S330. At step S330 again, the data selector A and the data selector B collect information on the next fan 1. Thereafter, the procedure follows the above-described steps recursively.

Although only preferred embodiments of the present invention have been described in detail above, those skilled in the art will readily appreciate that many modifications to the preferred embodiments are possible without materially departing from the novel teachings and advantages of the present invention. Accordingly, all such modifications are deemed to be covered by the following claims and allowable equivalents of the claims.

What is claimed is:

1. An apparatus for switching connectivity of objects to be sensed, the apparatus comprising:

a primary control board; and a secondary control board, which is connected to the primary control board via first sensing lines and control lines, and is connected to the objects via second sensing lines, the secondary control board comprising a control circuit and a switch circuit, wherein:

the control circuit comprises a counter with an output port, wherein the output port of the counter is controlled by a status of each of the control lines; and the switch circuit comprises at least one data selector, which has a channel selection port that receives counter values of the counter, a plurality of input ends connected to the objects in one-to-one correspondence, and an output end connected to the primary control board by one of the first sensing lines, each input end of the at least one data selector has an address value equal to a corresponding counter value of the counter, the output end of the at least one data selector transmits information of the objects to the primary control board according to the counter values received by the channel selection port of the at least one data selector correspondingly.

2. The apparatus as recited in claim 1, wherein each of the objects comprises a sensing unit fixed thereon for collecting information thereon.

3. The apparatus as recited in claim 1, wherein the counter is a 4-bit counter.

4. The apparatus as recited in claim 1, wherein the control lines comprise a reset signal line connecting the counter to the primary control board for zeroing the counter under the control of the primary control board.

5. The apparatus as recited in claim 1, wherein the control lines comprise a switch signal line connecting the counter to the primary control board for triggering the counter under the control of the primary control board.

6. The apparatus as recited in claim 1, wherein the counter of the control circuit comprises an address presetting end for determining a fixed output of the counter.

7. The apparatus as recited in claim 6, wherein the control lines comprise a reset signal line for setting the fixed output of the counter.

8. The apparatus as recited in claim 1, wherein the status of each of the control lines comprises an enabled status and a disabled status.

* * * * *